United States Patent
Koser et al.

[15] 3,698,575
[45] Oct. 17, 1972

[54] AUTOMATICALLY LOWERING UNLOADER

[72] Inventors: Robert F. Koser, P.O. Box 135, Almena, Wis. 54805; Jack D. Messner, Wayzata, Minn.

[73] Assignee: said Koser, by said Messner

[22] Filed: July 24, 1970

[21] Appl. No.: 57,949

[52] U.S. Cl.............................................214/17 DB
[51] Int. Cl................................................B65g 65/38
[58] Field of Search......................214/17 DB; 302/56

[56] References Cited

UNITED STATES PATENTS

| 3,539,059 | 11/1970 | Buschbom | 214/17 DB |
| 3,065,033 | 11/1962 | Keitshu | 214/17 DB X |
| 3,002,790 | 10/1961 | Chapman | 214/17 DB X |

FOREIGN PATENTS OR APPLICATIONS 1,110,084  6/1961  Germany...............214/17 DB Primary Examiner—Robert G. Sheridan
Attorney—Merchant & Gould

[57] ABSTRACT

An automatically lowering silo unloader for use in a silo having a discharge door opening that extends vertically for the greater portion of the height of the silo and having a plurality of vertically spaced narrow bridging members extending horizontally across the opening. The unloader includes a discharge chute that is disposed to direct silage generally radially of the silo upwardly through the vertically-extended opening, and torque arm means engageable with a side edge of the opening to automatically hold the discharge chute against rotation with the unloader and in line with the opening as the unloader moves downwardly within the silo during unloading of silage therefrom.

8 Claims, 4 Drawing Figures

INVENTORS.
ROBERT F. KOSER
JACK D. MESSNER
BY
Merchant & Gould
ATTORNEYS

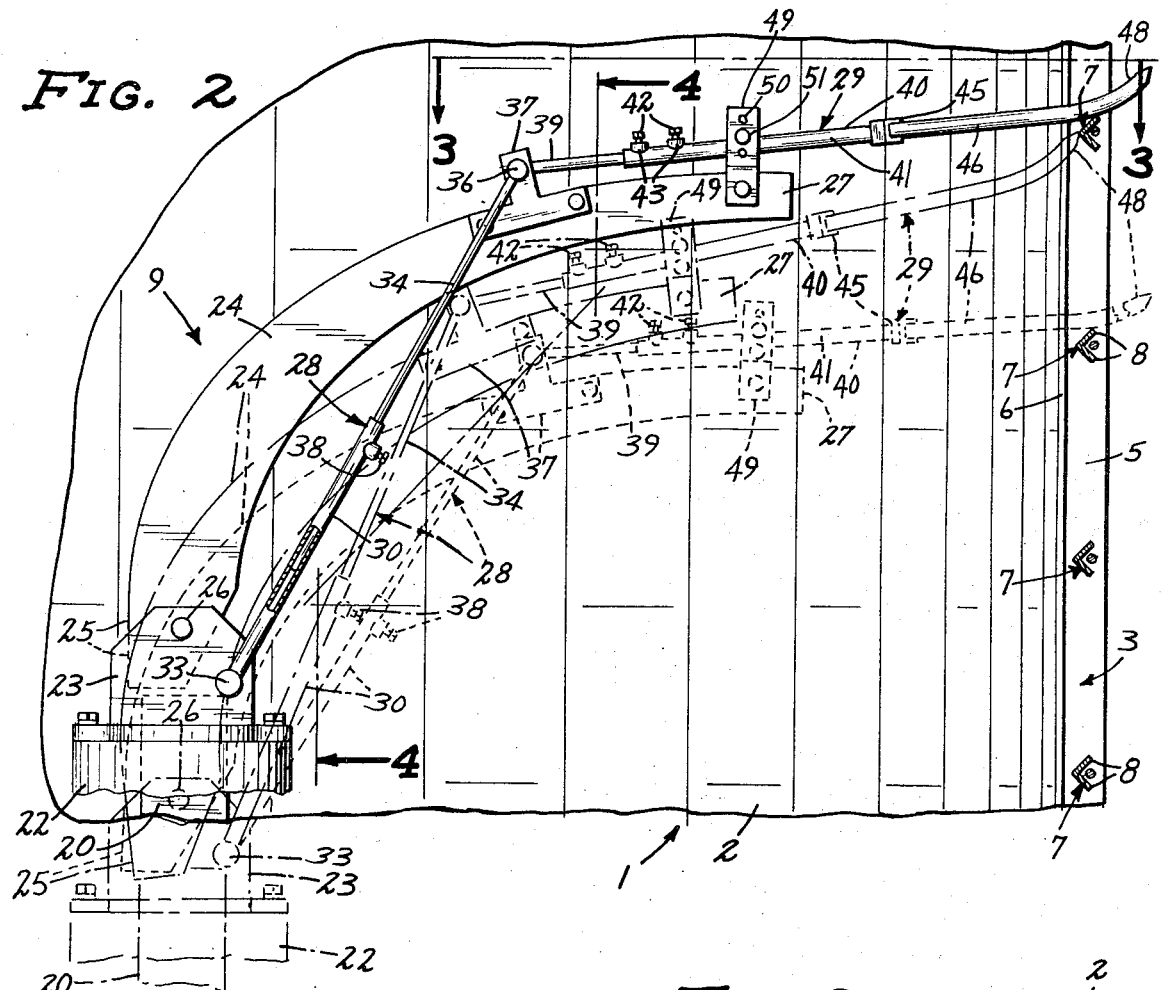
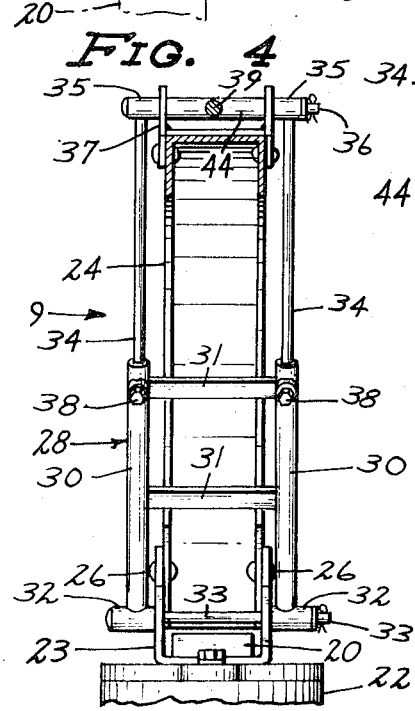
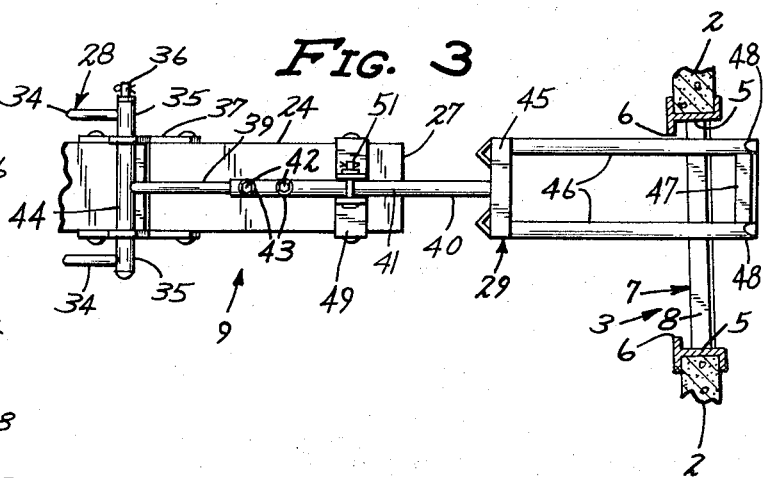
FIG. 2
FIG. 4
FIG. 3
INVENTORS.
ROBERT F. KOSER
JACK D. MESSNER
BY Merchant & Gould
ATTORNEYS

3,698,575

AUTOMATICALLY LOWERING UNLOADER

BACKGROUND OF THE INVENTION

Silos as such are well-known, these usually having a plurality of vertically spaced discharge openings. Silo unloaders are also well-known, particularly those which are at least partially supported by silage in the silo and which rotate on a generally vertical axis within the silo during discharge of silage. These are usually provided with a discharge spout or chute which is held against rotation and in a manner to direct silage outwardly through the discharge openings. With these arrangements, as the unloader works its way downwardly, the operator must periodically climb the silo and manually move the discharge chute from one discharge opening to a lower opening, to prevent the chute from becoming caught in an opening as the unloader descends.

SUMMARY OF THE INVENTION

This invention resides in a discharge chute mounted on a silo unloader for relative rotary movement therebetween and the unloader on a generally vertical axis, and for swinging movements relative to the unloader on a generally horizontal axis; and position determining mechanism pivotally connected to the unloader and discharge chute. The position determining mechanism is disposed to project outwardly through a discharge opening in a silo wall, the opening extending vertically for the greater part of the height of the silo and having a plurality of vertically-spaced horizontal bridging members extending between the opposite side edges of the opening. The position determining mechanism is disposed to rest upon an adjacent one of the bridging members during the silo unloading operation, and to be automatically disengaged therefrom and swing downwardly into overlying engagement with the next lower bridging member as the unloader descends, while holding the unloader chute against rotation and to direct silage toward the silo opening.

DESCRIPTION OF THE DRAWINGS

FIG. 2 is a fragmentary view in side elevation of the discharge chute and position determining mechanism of the unloader of FIG. 1;

FIG. 3 is a fragmentary view, partly in top plan and partly in section, taken substantially on the line 3—3 of FIG. 2;

FIG. 4 is a view, partly in side elevation and partly in section, taken on the line 4—4 of FIG. 2.

DETAILED DESCRIPTION OF THE PREFERRED EMBODIMENT

Figure 1:
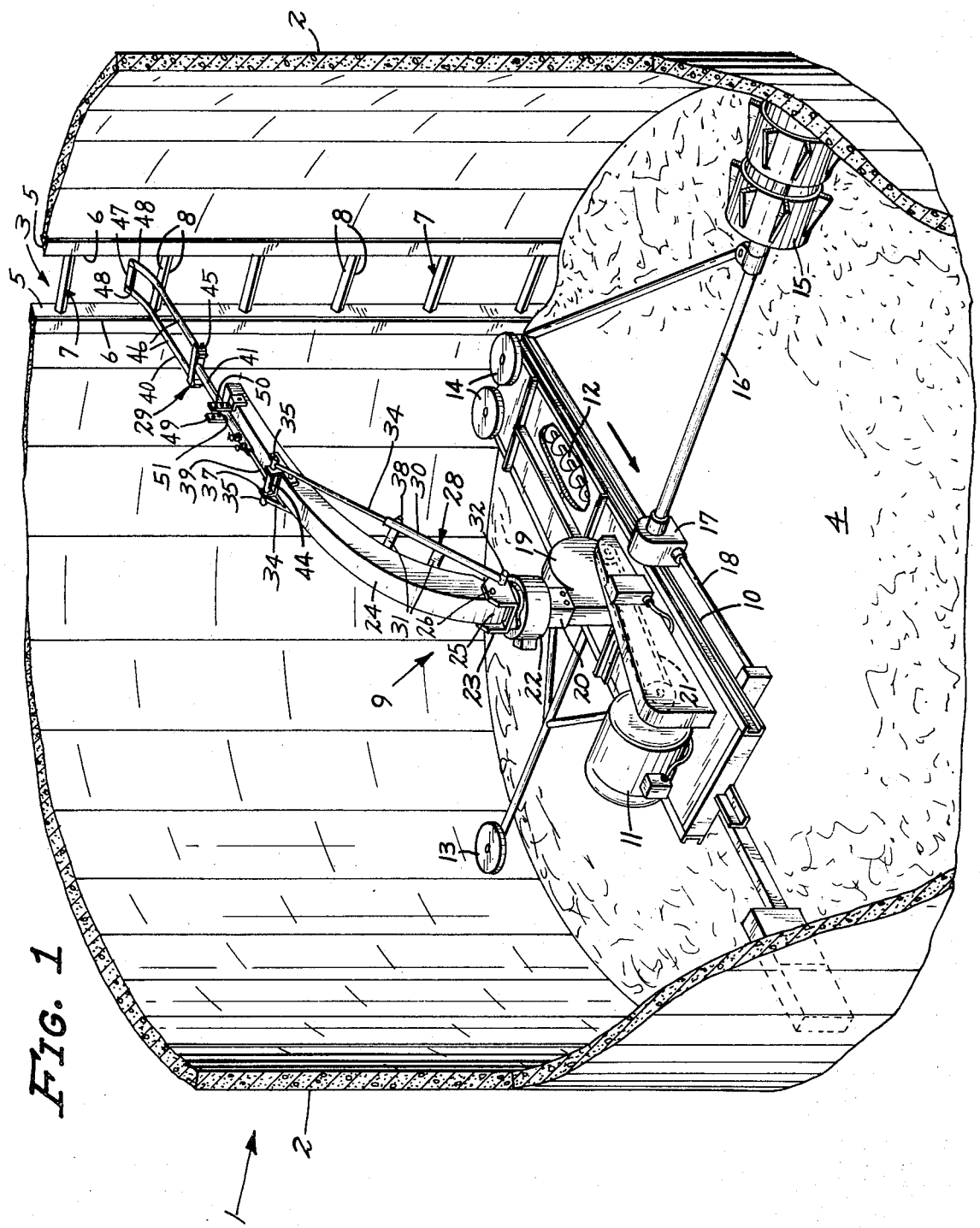
FIG. 1 is a fragmentary view in perspective of a silo having a vertically extended door opening, and a silo unloader produced in accordance with the present invention, installed therein.

A silo, indicated generally at 1, includes a cylindrical wall 2 having a discharge opening 3 therethrough that may be assumed to extend for the greater part of the height of the silo, for discharge of silage, indicated at 4, from the interior of the silo 1. The opening 3 has opposite side edges defined by a pair of laterally spaced parallel members 5 having inner longitudinal guide strips or rails defining guide edge surfaces 6. A plurality of vertically-spaced generally horizontal bridging members 7, preferably made from structural material, such as commercial angle iron or the like, extend between the beam members 5 and are welded or otherwise rigidly secured at their opposite ends to the beam members 5. With reference to FIG. 2, it will be seen that the bridging members 7 are so disposed that the flanges 8 thereof diverge in a direction outwardly of the silo. Normally, the opening 3 is closed by a plurality of removable doors, not shown, but which may be assumed to be disposed between the bridging members 7 and the guide surfaces 6. The doors are removable from the exterior of the silo when it is desired to remove silage 4 therefrom.

A silo unloader, indicated generally at 9, is disposed within the silo 1, and is adapted to move over the top surface of silage 4. The unloader 9 includes a frame 10, a drive motor 11, and suitable drive members extending from the drive motor 11 to drive silage engaging auger feeders 12, one of which is shown in FIG. 1. The unloader 9 further includes guide wheels 13 and 14 that engage the interior surface of the silo wall 2, and a drive wheel 15 engages the top surface of the silage 4 to impart rotary movement to the unloader 9 about a vertical axis. The drive wheel 15 is mounted on a shaft 16 that is operatively connected to the drive motor 11 by suitable power transmission mechanism including a gear box 17, an intermediate shaft 18, and other connections, not shown. The augers 12 are also driven from the motor 11 through suitable connections, not shown. The motor 11 further drives a conventional impeller, not shown, but disposed within an impeller housing 19, the impeller housing having a generally vertically extended discharge neck or the like 20. An endless drive chain connecting the motor 11 to the impeller within the housing 19 is shown by dotted lines in FIG. 1, and indicated at 21.

The unloader 9 includes a suitable fitting 22 that is rotatable about a vertical axis relative to the impeller discharge neck 20 and which has bolted or otherwise rigidly mounted thereon a generally U-shaped bracket 23. A curved goose neck or discharge chute 24 has its inner receiving end 25 pivotally mounted in the bracket 23, by means of aligned pivot pins 26 disposed on a generally horizontal axis. The opposite or discharge end portion 27 is generally horizontally disposed to direct silage, thrown by the impeller, in a direction generally radially of the silo 1 and outwardly through the discharge opening 3 thereof.

Position determining mechanism for supporting and guiding the chute 24 comprises inner and outer arms indicated generally at 28 and 29 respectively. The inner arm 28 comprises a pair of cooperating arm sections, one of which in the embodiment disclosed includes a pair of laterally-spaced parallel tubular members 30 connected by a pair of cross bars 31, and having transverse sleeves 32 at their inner ends that are mounted on opposite end portions of a shaft 33 that is journalled in the bracket 23 on an axis in spaced parallel relation to the axis of the pivot pins 26. The other inner arm section comprises a pair of laterally-spaced parallel rods or bars 34 having cross sleeves 35 welded or otherwise rigidly secured to one end of each thereof, and a shaft 36 extending through the sleeves 35. The rods or bars 34 are each telescopically slidably received in a different one of the tubular members 30. The shaft 36 is supported in parallel relation to the shaft 33 by a bracket 37 bolted or otherwise rigidly secured to the chute 24 intermediate the ends thereof. The tubular members 30 are each provided with a set screw or the like 38 for engagement with an adjacent one of the rods 34 to releasably lock the same against axial sliding movement relative to its respective tubular member 30, for a purpose which will hereinafter be described.

The outer arm 29, as shown, comprises cooperating arm sections 39 and 40, the arm section 40 including a longitudinally extending tubular portion 41, the outer arm section 39 being in the nature of a stem slidably telescopically received in the tubular portion 41 and engaged by a set screw or the like 42 screw-threaded in a nut element 43 on the tubular portion 41 to releasably lock the arm sections 39 and 40 in the desired set positions of longitudinal movement therebetween. At its inner end, the arm section or stem 39 is provided with a tubular cross member 44 that is journalled on the shaft 36 between laterally-spaced portions of the bracket 37. The arm section 40 further includes a cross member 45 welded or otherwise rigidly secured intermediate its ends to the radially outer end of the tubular portion 41, a pair of laterally-spaced generally parallel members 46 having inner ends rigidly secured to opposite ends of the cross member 45 and a transverse brace 47 connecting the outer generally upturned ends 48 of the members 46.

It will be noted that the outer arm 29 is capable of swinging movement relative to the discharge chute 24 on the axis of the shaft 36. A guide bracket 49 is rigidly mounted on the discharge chute 24 adjacent its discharge end 27, and has portions disposed at opposite sides of the tubular portion 41 of the arm section 40, these portions having a plurality of vertically-spaced aligned openings 50 for selective reception of a stop pin 51. The top of the chute 24 and the stop pin 51 cooperate to limit upward and downward swinging movement of the outer arm 29 on the axis of the shaft 36.

OPERATION

Prior to energization of the motor 11 to initiate unloading of silage or material from the silo 1, the arm 29 is adjusted as to length, so that the bars 46 are disposed in overlying relationship to a given one of the bridging members 7, as indicated by full lines in FIG. 2. The set screw 42 is tightened to maintain the overall length of the outer arm 29, and the set screws 38 are loosened to permit free axial sliding movements of the rods 34 within the tubular members 30, so that the bars 46 rest upon the underlying bridging member 7. The pin 51 is disposed in a given pair of aligned apertures 50 to dispose the discharge end 27 of the chute 24 at an elevation which will cause silage 4 flowing from the chute 24 to be discharged outwardly through the opening 3 between an adjacent pair of the bridging members 7, as shown in FIG. 2. It will be noted, particularly with reference to FIG. 3, that the bars 46 are spaced apart a distance somewhat less than the distance between the guide bars or rails 6, to permit free movement of the bars 46 between the guide rails 6. The motor 11 is then energized to cause the unloader 9 to move in a circular path within the silo 1, the unloader being guided by engagement of the guide wheels 13 and 14 with the inner surface of the silo wall 2. The feeding augers 12 engage the top surface of the silage 4 and feed the same to the impeller within the housing 19, the impeller throwing the silage upwardly into the chute 24 which guides the silage outwardly through the discharge opening 3 in the silo wall 2. As the unloader 9 rotates, being driven by the drive wheel 15, the chute 24 tends to rotate with the unloader 9, but is held against rotation by engagement of one of the arm bars 46 with an adjacent one of the guide surfaces 6 at the side edge of the opening 3. As silage 4 is discharged from the silo, the unloader 9 descends as shown by dot-and-dash lines and dotted lines in FIG. 2. During this descent of the unloader 9, the bars 46 are drawn inwardly due to the pivotal connection 26 of the chute 24 to the bracket 23, until the radially outer ends 48 of the bars 46 move inwardly beyond the adjacent bridging member 7. As soon as the outer ends 48 clear the adjacent bridging member 7, the chute 24 and arms 28 and 29 swing outwardly and downwardly by gravity until the bars 46 engage a lower bridging member 7 and rest thereon. It will be noted that the bridging members 7 are disposed radially outwardly with respect to the guide surfaces 6, so that the outer ends 48 of the bars 46 are held between the guide surfaces 6 at all times during downward movement of the unloader 9. With this arrangement, any desired quantity of silage may be discharged from the silo without the necessity of repeatedly climbing the silo to change the position of the discharge chute 24. In fact, the entire silo may be emptied without the necessity for entering the same, once the doors to the opening 3 have been removed.

When it is desired to fill the silo 1 with the loader 9 therein, the loader is raised to the top of the silo by the usual hoisting cable therefor, not shown. For the purpose of moving the bars 46 radially inwardly of the opening 3, so that the unloader 9 may be elevated to the top of the silo, the discharge chute 24 is swung upwardly and radially inwardly until the outer ends 48 of the bars 46 are well within the confines of the silo wall 2, and the set screws 38 are tightened against their respective rods or bars 34 to hold the chute 24 against outward and downward swinging movement. Then, when it is desired to unload the silo, it is only necessary to loosen the set screws 38 to permit the bars 46 to swing outwardly and downwardly with the chute 24, into engagement with one of the bridging members 7.

It will be appreciated that silos of a given nominal diameter are apt to vary in internal diameter, so that the axis of the discharge neck 20 of the impeller 19 does not always coincide with the axis of the silo. Thus, the axis of the neck 20 and the inlet end 25 of the discharge chute 24 will gyrate about the axis of the silo as the unloader 9 rotates therein. When this occurs, the bars 46 of the outer arm 29 partake of a combined lateral swinging and radially inward and outward reciprocating movement, which movement does not effect the operation of the arms 28 and 29 in maintaining the discharge chute 24 positioned to direct silage outwardly through the opening 3 in all positions of the chute 24.

While we have shown and described a commercial embodiment of our silo unloader, it will be understood that the same is capable of modification without departure from the spirit and scope of the invention, as defined in the claims.

What is claimed is:

1. For Use with a silo having a vertically extended cylindrical wall defining a vertically elongated opening therethrough having circumferentially spaced parallel side edges, and a plurality of fixed vertically spaced horizontal bridging members extending across said opening between said side edges; a silo unloader disposed to rest upon silage within the silo and to move downwardly responsive to discharge of material from the silo, said unloader including a discharge chute for directing silage generally radially outwardly relative to the silo, said chute having an inner end and a generally radially outer discharge end and mounted at its inner end on said unloader for swinging movement in a vertical plane generally radially of the silo; and chute positioning mechanism for holding said discharge chute in a given direction to deliver silage outwardly through said elongated openings, said mechanism extending generally longitudinally of said chute and comprising longitudinally inner and outer arms, said inner arm comprising a pair of inner arm sections, one of said inner arm sections being pivotally connected to the loader on a generally horizontal axis extending transversely of the inner arm and said chute, the other of said inner arm sections being longitudinally shiftably connected to said one of the arm sections and having an outer end, means for releasably locking said inner arm sections in desired set positions of relative longitudinal movement therebetween, and connecting means pivotally connecting said outer end and said outer arm to said chute in spaced relation to the inner end of the chute, said outer arm being disposed to extend outwardly through said opening in the silo in overlying engagement with one of said bridging members and to engage a side edge of the opening to hold said chute against movement in a direction laterally of said opening, said outer arm being operative to move inwardly relative to said opening out of overlying engagement with said one of the bridging members and angularly downwardly and outwardly into overlying engagement with another one of the bridging members below said one of the bridging members responsive to predetermined downward movement of the loader within the silo.

2. The unloader according to claim 1, including an unloader frame disposed to rotate in the silo on a vertical axis during unloading movements, and bracket means rotatably mounted on the frame on a generally vertical axis, said inner end of the chute being pivotally connected to said bracket means on a horizontal axis, said one of the inner arm sections comprising a pair of laterally spaced elongated members having inner ends pivotally connected to said bracket means and cross braces rigidly holding said elongated members in laterally spaced relationship at opposite sides of the chute, the other of said inner arm sections including a pair of arm elements each longitudinally slidably engaging a different one of said elongated members and having outer ends, said connecting means including a transverse shaft connected to said outer ends of the arm elements and to said chute and outer arm.

3. The unloader according to claim 1 in which said connecting means comprises a pivot shaft having an axis parallel to the axis of swinging movement of said chute positioning mechanism, said outer portion having an inner end connected to said pivot shaft for swinging movements relative to said inner arm and about the axis of the pivot shaft.

4. The unloader according to claim 3 characterized by adjustable stop means limiting said swinging movements of the outer portion.

5. The unloader according to claim 1 in which said outer arm comprises a pair of cooperating outer portion sections, one of said outer arm sections having an inner end pivotally connected to said chute by said connecting means, the other of said outer arm sections being longitudinally adjustable relative to said one of the outer arm sections.

6. The unloader according to claim 5 in which one of said outer arm sections defines a longitudinal recess, the other of said outer arm sections including a stem slidably received in said recess, characterized by means for releasably locking said outer arm sections in desired set positions of relative longitudinal adjustment thereof.

7. The unloader according to claim 5 in which said other one of the outer arm sections includes a pair of laterally-spaced generally parallel bars extending longitudinally of the arm sections and a pair of transverse connecting members, one at each end of said bars, and a longitudinally extending stem fixed to one of said transverse connecting members and longitudinally slidably secured to said one of the outer arm sections.

8. For use with a silo having a vertically extended cylindrical wall defining a vertically elongated opening therethrough having circumferentially spaced parallel side edges, and a plurality of fixed vertically spaced horizontal bridging members extending across said opening between said side edges; a silo unloader disposed to rest upon silage within the silo and to move downwardly responsive to discharge of material from the silo, said unloader including a discharge chute for directing silage generally radially outwardly relative to the silo, said chute having an inner end and a generally radially outer discharge end and mounted at its inner end on said unloader for swinging movement in a vertical plane generally radially of the silo; and chute positioning mechanism for holding said discharge chute in a given direction to deliver silage outwardly through said opening and comprising inner and outer portions extending generally longitudinally of the chute, said inner portion including a pair of connected sections longitudinally shiftable relative to each other, one of said sections having an inner end pivotally connected to said unloader on a generally horizontal axis extending transversely thereof and said chute, the other of said sections having an outer end, connecting means pivotally connecting said outer end to said chute in spaced relation to said inner end of said chute, said outer portion being disposed to extend outwardly through said opening in the silo in overlying engagement with one of said bridging members and to engage a side edge of said opening to hold said chute against movement in a direction laterally of said opening, said outer portion moving inwardly relative to said opening out of overlying engagement with said one of the bridging members and angularly downwardly and outwardly into overlying engagement with another one of the bridging members below said one of the bridging members responsive to predetermined downward movement of the loader within the silo, and means for releasably locking said sections in desired set positions of longitudinal shifting movements therebetween.

* * * * *